US009774273B2

(12) United States Patent
Suzuki et al.

(10) Patent No.: US 9,774,273 B2
(45) Date of Patent: Sep. 26, 2017

(54) ELECTRIC DEVICE AND METHOD OF CONTROLLING THE SAME

(71) Applicant: MAKITA CORPORATION, Anjo-shi, Aichi (JP)

(72) Inventors: Hitoshi Suzuki, Anjo (JP); Toshiyasu Kasuya, Anjo (JP); Hiroki Oka, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 14/835,100

(22) Filed: Aug. 25, 2015

(65) Prior Publication Data

US 2016/0065084 A1 Mar. 3, 2016

(30) Foreign Application Priority Data

Aug. 29, 2014 (JP) .................................. 2014-176156

(51) Int. Cl.
*H02M 7/00* (2006.01)
*H02M 3/04* (2006.01)
*H02J 7/00* (2006.01)

(52) U.S. Cl.
CPC ........... *H02M 7/003* (2013.01); *H02J 7/0052* (2013.01); *H02J 7/0054* (2013.01); *H02M 3/04* (2013.01); *H02J 2007/0062* (2013.01)

(58) Field of Classification Search
CPC ... H01L 25/112; H01L 25/115; H01R 13/667; H01R 31/065; H02J 7/0003; H02J 7/0004; H02J 7/0054; H03M 3/04; H03M 7/003; H02M 3/04; H02M 7/003

USPC .......................... 363/144, 146, 147; 320/112
See application file for complete search history.

(56) References Cited

U.S. PATENT DOCUMENTS

| | | | | |
|---|---|---|---|---|
| 5,982,652 A * | 11/1999 | Simonelli | ............... | H02J 9/062 307/26 |
| 7,589,500 B2 * | 9/2009 | Johnson | .................... | B25F 5/00 320/114 |
| 8,919,456 B2 * | 12/2014 | Ng | ........................ | B25B 23/147 173/11 |
| 9,189,663 B2 * | 11/2015 | Goren | ....................... | G06K 7/01 |
| 2007/0067659 A1* | 3/2007 | Tevanian, Jr. | ........ | G06F 1/3215 713/324 |
| 2008/0239608 A1* | 10/2008 | Yoshitomi | ................ | H02H 5/04 361/103 |
| 2008/0311955 A1* | 12/2008 | Kim | .................. | H04M 1/72527 455/557 |
| 2010/0041262 A1* | 2/2010 | Chesneau | ............... | H01F 27/42 439/188 |
| 2011/0181432 A1* | 7/2011 | Ou | .......................... | G06F 1/266 340/664 |

(Continued)

FOREIGN PATENT DOCUMENTS

JP 2013-070504 A 4/2013

*Primary Examiner* — Adolf Berhane
(74) *Attorney, Agent, or Firm* — Oliff PLC

(57) ABSTRACT

An electric device in one aspect of the present disclosure comprises a connector, a power supply unit, a connection-detection unit, and a control unit. The control unit is configured to control electric power supplied to the power supply unit from a battery so as to increase electric power supplied to the power supply unit when the connection-detection unit detects that an external device is connected to the connector.

16 Claims, 7 Drawing Sheets

(56) References Cited

U.S. PATENT DOCUMENTS

| | | | |
|---|---|---|---|
| 2012/0306434 A1* | 12/2012 | Sassen | H02J 7/0027 |
| | | | 320/107 |
| 2016/0006283 A1* | 1/2016 | Liu | H02J 7/0052 |
| | | | 320/112 |
| 2016/0036254 A1* | 2/2016 | Jeong | H02J 7/0029 |
| | | | 320/137 |

* cited by examiner

ELECTRIC DEVICE AND METHOD OF CONTROLLING THE SAME

CROSS-REFERENCE TO RELATED APPLICATIONS

This application claims the benefit of Japanese Patent Application No. 2014-176156 filed Aug. 29, 2014 in the Japan Patent Office, and the disclosure of which is incorporated herein by reference.

BACKGROUND

The present disclosure relates to an electric device comprising a power supply circuit that supplies electric power to an external device via a connector.

For instance, an example of a rechargeable electric device disclosed in Japanese Unexamined Patent Application Publication No. 2013-070504 is configured to have a battery pack, which incorporates a rechargeable battery, detachably attached thereto, and receive electric power supply from the attached battery pack to light a light.

Aside from the rechargeable electric device mentioned above, electric devices of different kinds, such as a rechargeable electric power tool, a rechargeable vacuum cleaner, a rechargeable gardening tool (mowing machine, etc.), and a rechargeable radio, are also known as rechargeable electric devices that operate by receiving electric power from a battery.

SUMMARY

A rechargeable electric device of this kind may be configured so as to supply electric power to an external device (for example, mobile device such as a mobile phone or a smart phone) from a battery of the rechargeable electric device thereby to charge a rechargeable battery in the external device.

In this case, a rechargeable electric device may be provided with a connector, such as a socket to receive a USB (Universal Serial Bus) plug, for supplying electric power to the external device via a specified cable and may be configured to supply electric power to the external device via this connector.

However, it requires a constant operation of a power supply circuit that generates power supply voltage to supply electric power to the external device in the rechargeable electric device. Such operation of the power supply circuit may cause unnecessary increase in power consumption of the rechargeable electric device.

It is desirable that one aspect of the present disclosure can provide a technique that can reduce a standby power consumption of a power supply circuit to supply electric power to an external device via a connector in an electric device.

An electric device in one aspect of the present disclosure comprises a connector, a power supply unit, a connection-detection unit, and control unit. The connector is configured to couple to an external device. The power supply unit is configured to supply electric power to the external device via the connector. The connection-detection unit is configured to detect whether the external device is coupled to the connector.

The control unit is configured to control electric power supplied to the power supply unit from a battery so as to increase electric power supplied to the power supply unit when the connection-detection unit detects that the external device is coupled to the connector.

With such electric device, it is possible to reduce electric power supplied to the power supply unit thereby to reduce power consumption of the battery when no external device is coupled to the connector and thus no electric power supply is needed for the external device. In short, it is possible to achieve a power-saving on the electric device.

The connector may comprise a power supply terminal. The connection-detection unit may be configured to detect that the external device is coupled to the connector by a voltage change in the power supply terminal. The control unit may be configured to increase electric power supplied to the power supply unit when the connection-detection unit detects that the external device is coupled to the connector.

The power supply unit may be configured to supply electric power to the external device so as to keep the voltage of the power supply terminal constant when a value of a current that flows to the connector is within a specified range. The power supply unit may be configured to reduce the voltage of the power supply terminal and limit the value of the current that flows to the connector to a specified upper limit or below when the value of the current that flows to the connector reaches the upper limit.

In this case, it is possible to reduce electric power supplied from the power supply unit to the external device to a specified electric power or below and restrain or prevent the power supply unit from being overheated.

In addition, the control unit may be configured to either reduce or block electric power supplied to the power supply unit when the value of the current that flows to the connector is equal to or below a specified lower limit.

In this case, it is possible to reduce a standby current that flows to the power supply unit and achieve a further power-saving on the electric device by either stopping operation of the power supply unit or restricting the operation of the power supply unit when electric power supply is not necessary for the external device that is coupled to the connector.

The electric device may comprise a voltage detection unit that is configured to detect a value of a battery voltage of the battery. The control unit may be configured to perform a specified protective operation when the value of the battery voltage detected by the voltage detection unit is equal to or below an overdischarge threshold value and to set the overdischarge threshold value in accordance with a result of detection by the connection-detection unit.

The overdischarge threshold value may be set to vary between a case where the external device is coupled to the connector and a case where the external device is not coupled to the connector.

The control unit may be configured to notify information related to the battery voltage via a notification unit when the value of the battery voltage detected by the voltage detection unit is equal to or below the overdischarge threshold value. When this is the case, it is possible to encourage a user of the electric device to charge the battery when the battery voltage is decreased.

The control unit may be configured to set the overdischarge threshold value in accordance with a result of detection by the connection-detection unit such that the overdischarge threshold value while the external device is coupled to the connector is set smaller than the overdischarge threshold value while the external device is not coupled to the connector.

In the above case, it is possible to encourage the user to charge the battery in an early stage when the external device is not coupled to the connector, or use the electric device to supply electric power to the external device until the battery is empty (i.e., until the battery voltage reaches a lowest voltage) when the external device is coupled to the connector.

The control unit may be configured to continue the notification via the notification unit until at least one of a first condition and a second condition is satisfied after the value of the battery voltage detected by the voltage detection unit has become equal to or below the overdischarge threshold value: the first condition is a condition that the value of the battery voltage reaches a set value smaller than the overdischarge threshold value; and, the second condition is a condition that a specified time elapses.

The control unit may be configured to light a light emitting unit in accordance with a preset timing when the connection-detection unit detects that the external device is not coupled to the connector. In this case, it is possible for the user to easily identify a location of the electric device.

The electric device may comprise an oscillation/impact detection unit that is configured to detect at least either an oscillation or an impact applied to the electric device. The control unit may be configured to light the light emitting unit in accordance with a preset timing for a given length of time when either one of an oscillation or an impact is detected by the oscillation/impact detection unit.

If the electric device in the above case is a rechargeable light or radio that is possibly used in the event of a power outage or a natural disaster, the electric device can be easily found by lighting the light emitting unit automatically by an oscillation or an impact.

The electric device may further comprise a luminance detection unit that is configured to detect a value of luminance surrounding the electric device. The control unit may be configured to light the light emitting unit in accordance with a preset timing when the value of the surrounding luminance detected by the luminance detection unit is equal to or below a specified value.

If the surroundings of the electric device are dark (i.e. when it is not easy to find where the electric device is) in the above case, electric power consumption due to the light emission of the light emitting unit can be reduced by lighting the light emitting unit in accordance with the preset timing.

The electric device may comprise a grip portion that is configured to provide a grip for the user, and the battery. The connector may be disposed between the grip portion and the battery.

The electric device may further comprise a power-consumption unit that is configured to consume electric power of the battery and disposed on a side of the grip portion opposite to a side where the battery is provided.

Another aspect of the present disclosure is a method of controlling an electric device. The electric device comprises a connector that is configured to couple to an external device, and a power supply unit that is configured to supply electric power to the external device via the connector. The method comprises detecting whether the external device is coupled to the connector, and controlling electric power supplied to the power supply unit from a battery so as to increase electric power supplied to the power supply unit when it is detected that the external device is coupled to the connector.

As for an electric device comprising a power supply circuit to supply electric power to an external device via a connector, a standby power consumption of a power supply circuit can be reduced by using the above method.

BRIEF DESCRIPTION OF THE DRAWINGS

An exemplary embodiment will be described hereinafter by way of example with reference to the accompanying drawings, in which.

DETAILED DESCRIPTION OF THE PREFERRED EMBODIMENTS

Figure 1:
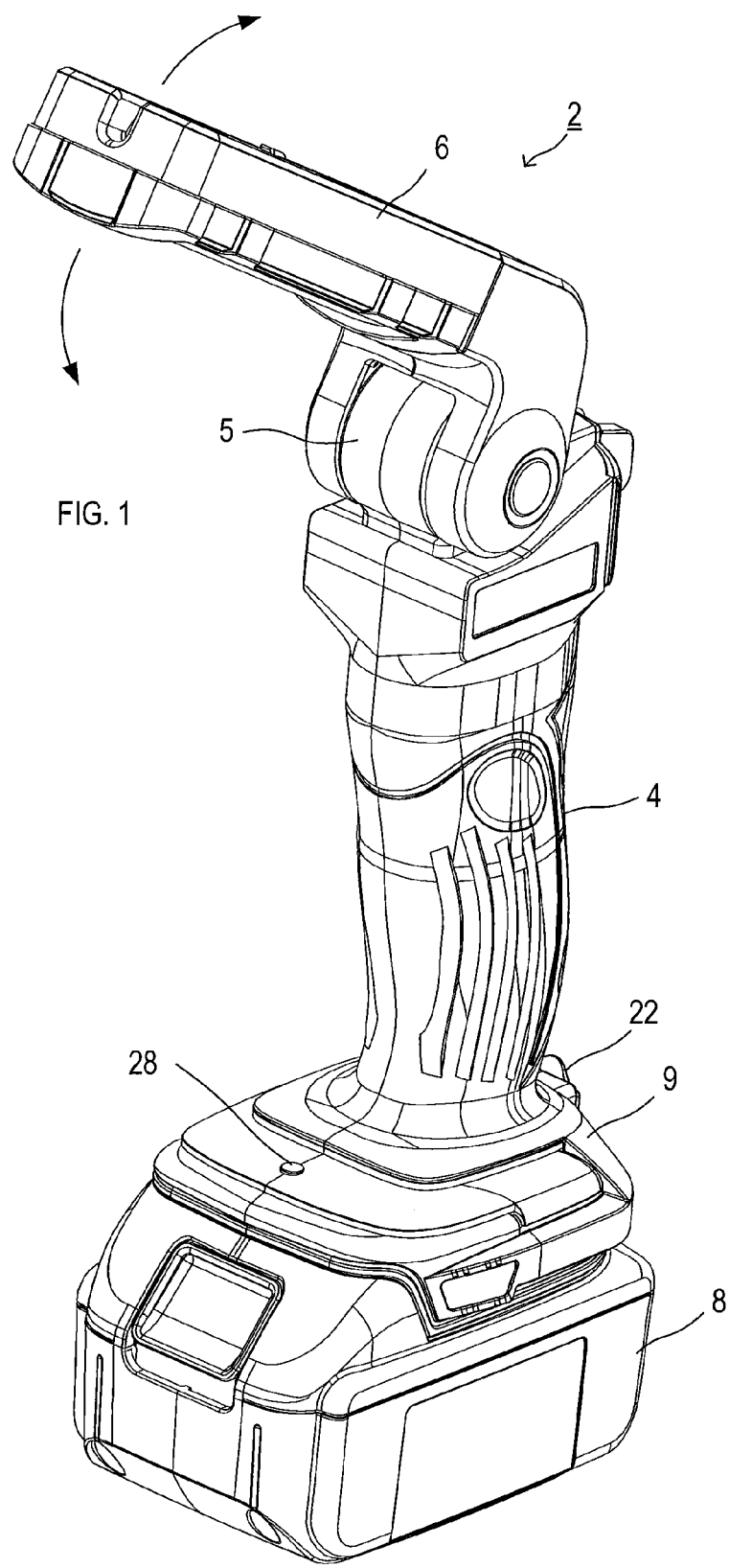
FIG. 1 is a perspective view of an external appearance of a rechargeable lighting device according to an exemplary embodiment.
Figure 2:
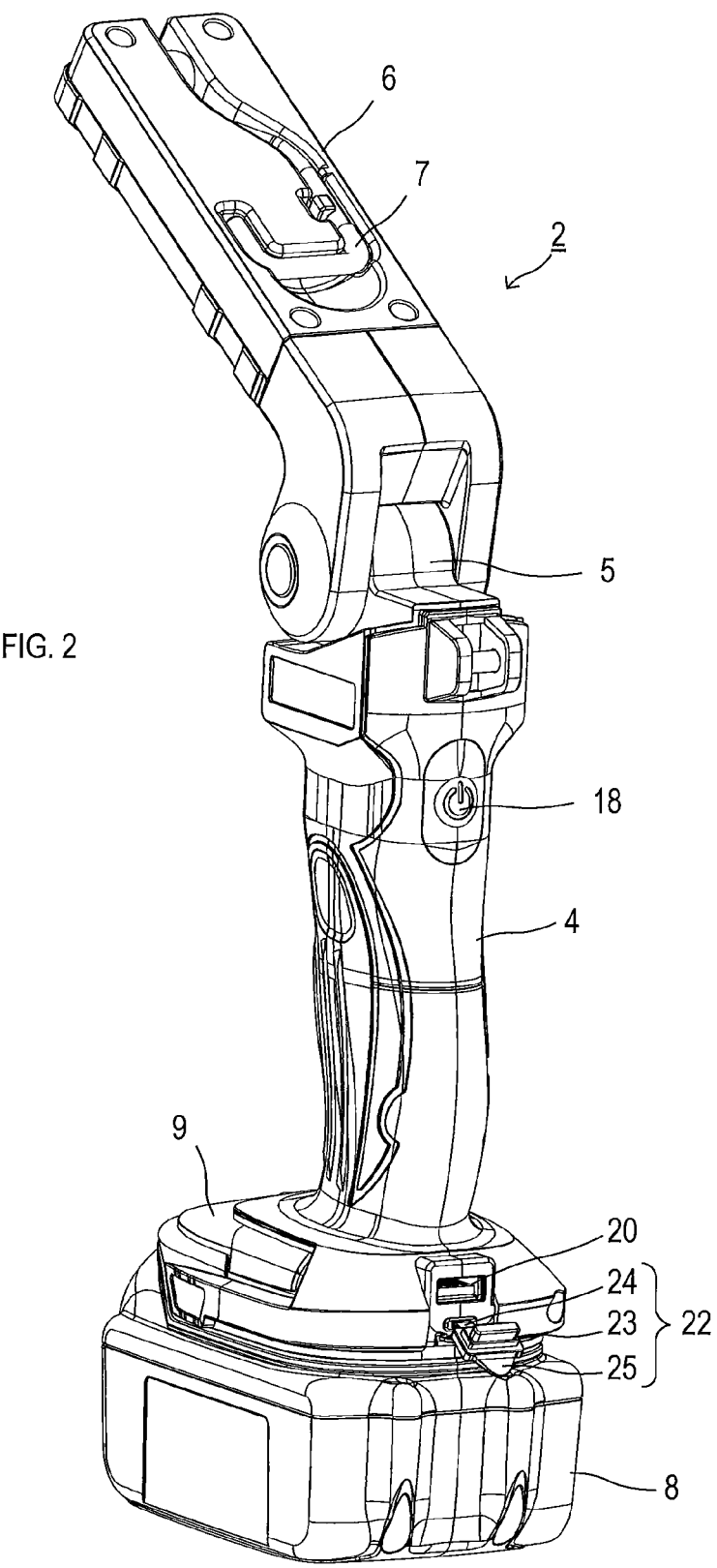
FIG. 2 is a perspective view of a lighting device viewed from a direction opposite to that of FIG. 1.
Figure 3:
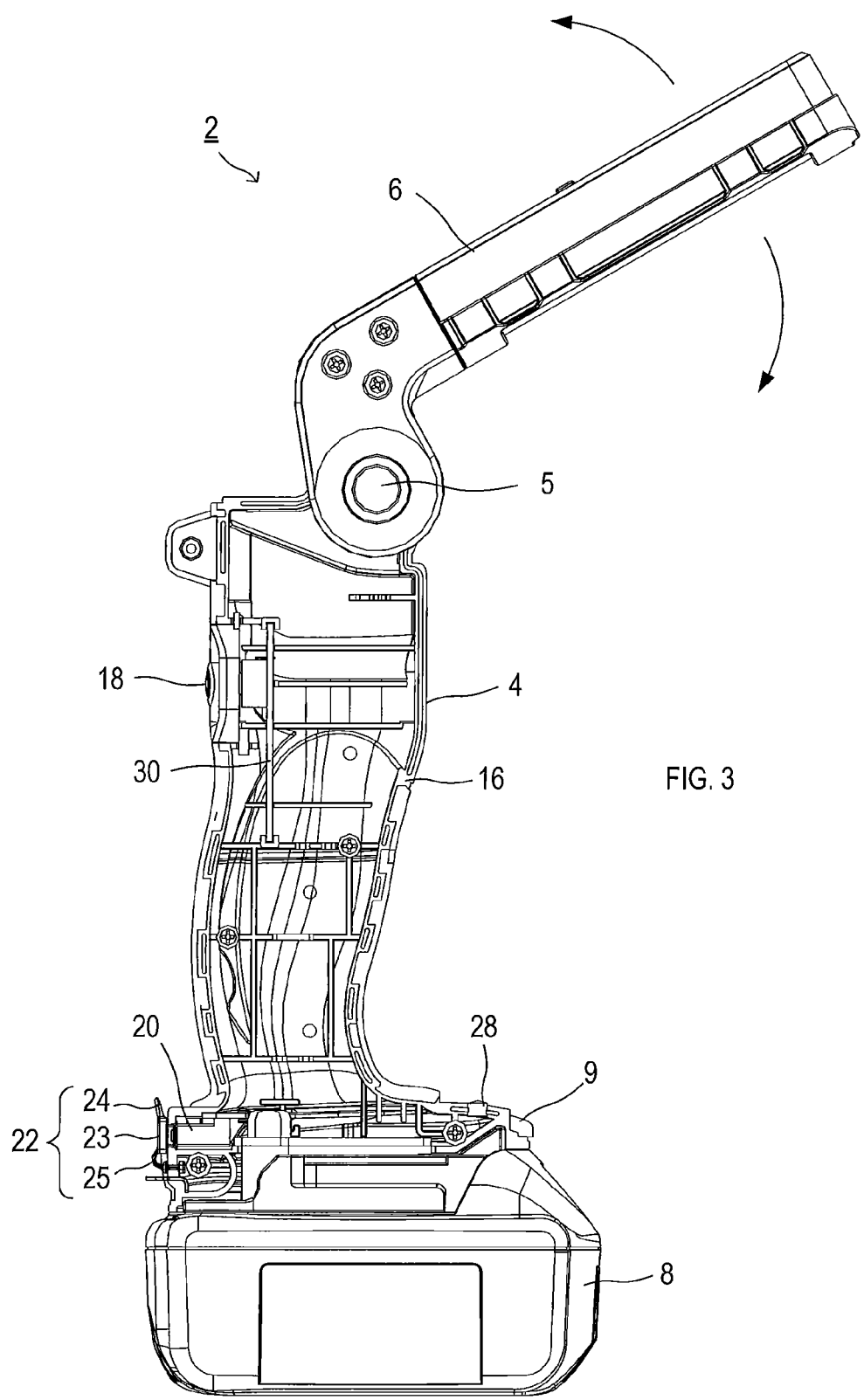
FIG. 3 is an explanatory drawing showing an inner structure of a lighting device.

As shown in FIG. 1 to FIG. 3, a rechargeable lighting device (hereinafter, simply referred to as "lighting device") 2 of the present exemplary embodiment is a lighting device that is configured to be operational for on-site work. The lighting device comprises a grip portion 4 that is formed into a rod-like shape to provide a grip for a user; a light unit 6 that is disposed on a first end-side of the grip portion 4 in the longitudinal direction (the upper side in FIG. 1 to FIG. 3); and, a battery pack 8 that is detachably attached to a second end-side of the grip portion 4 in the longitudinal direction (the lower side in FIG. 1 to FIG. 3), the second end-side being opposite the first end-side on the grip portion 4.

The light unit 6 is disposed such that it can swing to the directions indicated with arrows in FIG. 1 and FIG. 3 in relation to the grip portion 4 and be folded towards the grip portion 4 via a connecting part 5 that is disposed on the first end-side of the grip portion 4.

Figure 4:
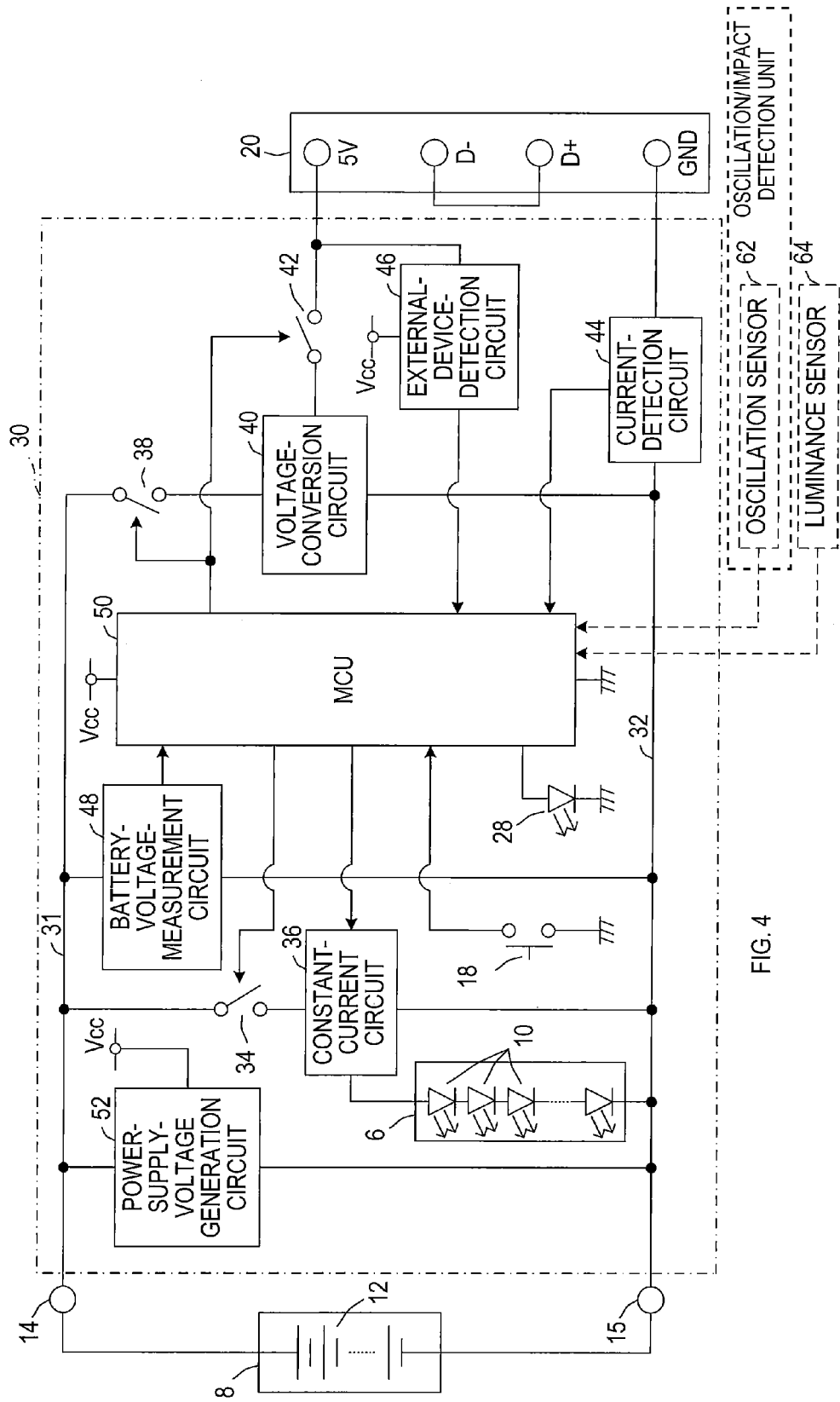
FIG. 4 is a block diagram showing a circuit configuration of a lighting device.

A first surface of the light unit 6 faces the grip portion 4 when the light unit 6 is folded towards the grip portion 4. The first surface comprises a plurality of light-emitting elements (LED) 10 dispersed thereon, as shown in FIG. 4, such that light from each light-emitting element 10 is radiated to the surroundings.

A second surface of the light unit 6, which is opposite the first surface, comprises a hook 7 stored therein to hook the lighting device 2 on a surrounding tree or structure.

Next, the battery pack 8 comprises at least a rechargeable battery 12 (see, FIG. 4), such as a lithium-ion battery, integrated therein. In addition, the battery pack 8 is detachably attached to an attachment portion 9 that is disposed on the second end-side of the grip portion 4.

When the battery pack 8 is attached to the attachment portion 9, the battery 12 is electrically coupled to a circuit board 30 (see, FIG. 3) inside the grip portion 4 via connection terminals 14 and 15 (see, FIG. 4) disposed in the attachment portion 9.

As shown in FIG. 3, the grip portion 4 comprises a hollow synthetic resin case 16 that is formed into a shape to provide an easy grip for the user; the circuit board 30 and other components are placed inside the case 16. The case 16 comprises a first wall that faces the light unit 6 when the light unit 6 is folded, and a second wall opposite the first wall. The circuit board 30 is arranged along the second wall.

Hereinafter, the first-wall side of the grip portion 4 is referred to as the front of the lighting device 2; the second-wall side of the grip portion 4 is referred to as the back of the lighting device 2.

An operation switch 18 is disposed on the second wall; the operation switch 18 is for switching the state of the lighting device 2 between ON and OFF by being pressed by the user. The operation switch 18 is electrically coupled to the circuit board 30.

A USB (Universal Serial Bus) connector 20 is disposed at the back of the attachment portion 9; the USB connector 20 is for supplying electric power to an external device (for example, a mobile phone or a smart phone) that can be supplied with electric power via a USB cable. In short, the USB connector 20 is disposed between the grip portion 4 and the battery pack 8.

This USB connector 20 is a socket to receive a USB plug and has a terminal structure that is compliant with the USB standard. In other words, as shown in FIG. 4, the USB connector 20 comprises a positive power supply terminal (5V), a negative power supply terminal (GND), and a pair of communication terminals (D−, D+).

In the present exemplary embodiment, this USB connector 20 is used for supplying electric power to the external device; thus, the pair of communication terminals (D−, D+) is coupled to each other, and the positive power supply terminal (5V) and the negative power supply terminal (GND) disposed between the pair of communication terminals are used as the terminals for supplying electric power.

As shown in FIG. 2 and FIG. 3, the attachment portion 9 comprises a cap 22 that protects the USB connector 20 when no external device is coupled to the USB connector 20. The cap 22 comprises a cap body 23 that is inserted into the USB connector 20, a belt part 24 for attaching the cap body 23 to the attachment portion 9, and a protuberance 25 for allowing the user to handle the cap 22 with the user's fingertips when removing the cap body 23 from the USB connector 20.

A notification LED 28 is disposed on the front side of the attachment portion 9; the notification LED 28 is for notifying a condition of the lighting device 2, for example, a decrease in remaining amount of electric power in the battery 12.

The USB connector 20 and the notification LED 28 are electrically coupled to the circuit board 30 via wiring inside the case 16 (not shown).

As shown in FIG. 4, the circuit board 30 comprises a positive power-supply line 31 that is coupled to a positive electrode side of the battery 12 via the connection terminal 14, and a negative power-supply line (i.e., a ground line) 32 that is coupled to a negative electrode side of the battery 12 via the connection terminal 15.

The circuit board 30 comprises a constant-current circuit 36, a voltage-conversion circuit 40, a current-detection circuit 44, an external-device-detection circuit 46, a battery-voltage-measurement circuit 48, a control circuit 50, and a power-supply-voltage generation circuit 52.

When a switching element 34 is in the ON state, the constant-current circuit 36 is electrically coupled to the positive power-supply line 31 and the negative power-supply line 32, supplies a constant current to the light-emitting elements 10 in the light unit 6, and turns on the light unit 6.

When a switching element 38 is in the ON state, the voltage-conversion circuit 40 is electrically coupled to the positive power-supply line 31 and the negative power-supply line 32, and supplies a specified power supply voltage (5V) to the positive power supply terminal of the USB connector 20. More specifically, the voltage-conversion circuit 40 is configured to control an output voltage thereof to be constant if a value of a current that flows from the USB connector 20 to the external device is within an acceptable range. Further, the voltage-conversion circuit 40 is configured to reduce the output voltage to limit the value of the current that flows to the external device to the upper limit or below if the value of the current exceeds the upper limit. The voltage-conversion circuit 40 of the present exemplary embodiment may be configured as a DC-DC converter. A DC-DC converter can control an output voltage thereof to be constant if the value of the current that flows from the USB connector 20 to the external device is within an acceptable range. On the other hand, the DC-DC converter cannot control the output voltage to be constant if the value of the current that flows to the external device exceeds the upper limit, and thus, the output voltage is reduced to limit the value of the current to the upper limit or below.

A switching element 42 is disposed on an output path of the power supply voltage (5V) from the voltage-conversion circuit 40 to the USB connector 20. This is to prevent or to reduce inflow of a current to the voltage-conversion circuit 40 from the external device that is coupled to the USB connector 20 or from the external-device-detection circuit 46 when the switching element 38 is in the OFF state and the voltage-conversion circuit 40 stops its operation.

Thus, the state of the switching element 42 is switched between ON and OFF in conjunction with the switching element 38 by the control circuit 50, which will be mentioned later. Additionally, each of the switching elements 34, 38, and 42 is configured to switch its state between ON and OFF in accordance with a command from the control circuit 50. In the present exemplary embodiment, each of the switching elements 34, 38, and 42 may be a semiconductor element such as FET (Field Effect Transistor).

Next, the ground line 32 is electrically coupled to the negative power supply terminal (GND) of the USB connector 20. The current-detection circuit 44 is disposed on the ground line 32 and detects a value of a current that flows through the ground line 32, in other words, a value of a current that is supplied from the battery 12 to the external device coupled to the USB connector 20.

When the switching element 42 is in an OFF state, the external-device-detection circuit 46 detects that the external device is coupled to the USB connector 20 from a voltage change in the positive power supply terminal of the USB connector 20.

The battery-voltage-measurement circuit 48 is electrically coupled to the positive power-supply line 31 and the negative power-supply line 32 and measures a value of an output voltage (battery voltage) of the battery 12 that is electrically coupled to the connection terminals 14 and 15.

Detection signals from the current-detection circuit 44, the external-device-detection circuit 46, and the battery-voltage-measurement circuit 48, as well as an input signal from the operation switch 18 are inputted into the control circuit 50.

The control circuit 50 lights the light unit 6 and supplies electric power to the external device based on the inputted signals from the individual parts mentioned above. The control circuit 50 of the present exemplary embodiment is configured as an MCU (Micro Control Unit). The MCU may be a microcomputer; a combination of various separate electronic components; an ASIC (Application Specified Integrated Circuit); a programmable logic device, such as a FPGA (Field Programmable Gate Array); or a combination of these.

The power-supply-voltage generation circuit 52 supplies a power supply voltage (direct current constant voltage) Vcc for operation to the control circuit 50 and the external-device-detection circuit 46. More specifically, the powersupply-voltage generation circuit 52 generates the power supply voltage Vcc from electric power supplied from the battery 12 via the positive power-supply line 31 and the negative power-supply line 32.

Next, a control process executed by the control circuit 50 will be explained referring to the flowchart of FIG. 5.

Figure 5:
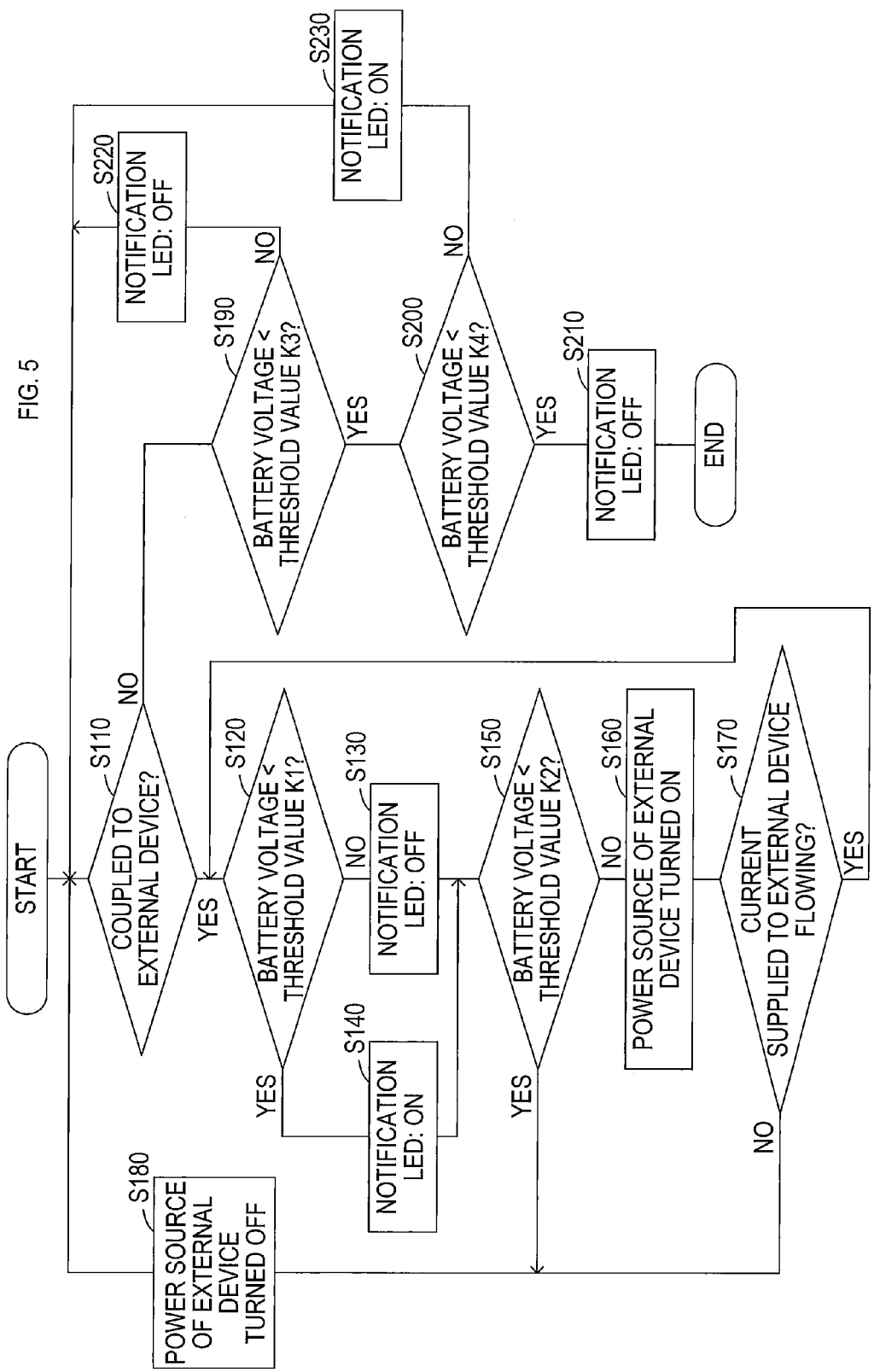
FIG. 5 is a flowchart showing a control process performed by MCU in a lighting device.

The control process shown in FIG. 5 is a process that is executed as one of main routines when the control circuit 50 is in operation as the power supply voltage Vcc is supplied from the power-supply-voltage generation circuit 52.

In this control process, it is first determined in S110 (S stands for a step) whether the external device is coupled to the USB connector 20 based on a detection signal from the external-device-detection circuit 46. If the external device is coupled to the USB connector 20, the process then proceeds to S120; if no external device is coupled to the USB connector 20, the process then proceeds to S190.

In S120, it is determined whether the value of the battery voltage detected by the battery-voltage-measurement circuit 48 is less than a preset threshold value K1. The threshold value K1 is a threshold value for determining an overdischarge while the external device is coupled to the USB connector 20, and is used for determining whether to encourage the user to charge the battery 12 by lighting the notification LED 28.

If it is determined in S120 that the value of the battery voltage is less than the threshold value K1, the process then proceeds to S140 to turn ON the notification LED 28 (light is on); if it is determined in S120 that the value of the battery voltage is equal to or above the threshold value K1, the notification LED 28 is then turned OFF (light is off) in S140.

Next, it is determined in S150 whether the value of the battery voltage is less than a preset threshold value K2. The threshold value K2 is a threshold value for determining, based on the value of the battery voltage, whether a remaining amount of electric power charged in the battery 12 is equal to or more than the electric power practicable to supply electric power to the external device. The threshold value K2 is set greater than the threshold value K1 in the present exemplary embodiment.

If it is determined in S150 that the value of the battery voltage is equal to or above the threshold value K2, the process proceeds to S160 to turn ON the switching elements 38 and 42. As a consequence, a current conduction to the voltage-conversion circuit 40 begins, and a power supply voltage that is generated by the current conduction to the voltage-conversion circuit 40 is outputted from the USB connector 20 to the external device. In other words, in S160, a power source of the external device that is coupled to the USB connector 20 is turned ON and electric power is supplied to the external device.

Next, it is determined in S170, based on a detection signal from the current-detection circuit 44, whether a current is flowing to the external device via the power supply terminal of the USB connector, in other words, whether the external device is in operation. In S170, it may be determined whether the value of the current that flows to the external device is equal to or below a specified lower limit.

If it is determined in S170 that the current is flowing to the external device (or, that the value of the current flowing to the external device is greater than the lower limit), the process then proceeds to S120; if it is determined that no current is flowing to the external device (or, that the value of the current flowing to the external device is equal to or below the lower limit), the process then proceeds to S180.

The process also proceeds to S180 if it is determined in S150 that the value of the battery voltage is less than the threshold value K2.

In S180, by turning OFF the switching elements 38 and 42, the current conduction to the voltage-conversion circuit 40 is stopped and electric power supply to the external device is blocked. In other words, electric power supply to the external device is blocked by turning OFF the power source of the external device coupled to the USB connector 20. After turning OFF the power source of the external device in S180, the process proceeds to S110. In S180, a switching frequency of the voltage-conversion circuit 40 that is configured as a DC-DC converter may be reduced.

Next, it is determined in S190 whether the value of the battery voltage is less than a preset threshold value K3; S190 is executed when it is determined in S110 that no external device is coupled to the USB connector 20.

The threshold value K3 is a threshold value for determining an overdischarge while no external device is coupled to the USB connector 20 and is set greater than the threshold value while the external device is coupled to the USB connector 20 (i.e., the threshold value K1). The reason for this is because it is not necessary to operate the voltage-conversion circuit 40 to supply electric power to the external device.

If it is determined in S190 that the value of the battery voltage is equal to or above the threshold value K3, the notification LED 28 is turned OFF (light is off) in S220, and the process proceeds to S110.

On the other hand, if it is determined in S190 that the value of the battery voltage is less than the threshold value K3, the process proceeds to S200 to determine whether the value of the battery voltage is less than a threshold value K4, which is smaller than the threshold values K1 to K3.

If it is determined in S200 that the value of the battery voltage is equal to or above the threshold value K4, the notification LED 28 is turned ON (light is on) in S230, and then the process proceeds to S110.

If it is determined in S200 that the value of the battery voltage is less than the threshold value K4, the notification LED 28 is turned OFF (light is off) in S210, and then the control process is ended.

The reason for this is because the threshold value K4 is the lowest overdischarge threshold value of all the threshold values K1 to K4, and the battery 12 will be overdischarged and deteriorated if the battery 12 is kept discharged for lighting the notification LED 28 and for other purposes.

As mentioned hereinbefore, the control circuit 50 makes the voltage-conversion circuit 40 operate when the external device is coupled to the USB connector 20 in the lighting device 2 of the present exemplary embodiment.

When a current does not flow from the USB connector 20 to the external device and the external device stops its operation, the control circuit 50 stops the operation of the voltage-conversion circuit 40 and maintains stopping of the operation of the voltage-conversion circuit 40 until the external device is coupled to the USB connector 20.

Thus, according to the present exemplary embodiment, when no external device is coupled to the USB connector 20 and it is not necessary to supply electric power to the external device, a standby current generated from the operation of the voltage-conversion circuit 40 can be made substantially zero, and the lighting device 2 can be made power-saving.

As for the voltage-conversion circuit 40 that is configured as a DC-DC converter, in particular, its consumed power at the time of operation increases by switching of a semiconductor element for voltage conversion included in the voltage-conversion circuit 40; nevertheless, by stopping its operation as in the present exemplary embodiment, power consumption of the battery 12 can be efficiently reduced.

In the present exemplary embodiment, when no external device is coupled to the USB connector 20, the operation of the voltage-conversion circuit 40 is completely stopped by turning OFF the switching element 38. Alternatively, it may be configured to reduce a switching frequency of the voltage-conversion circuit 40 that is configured as a DC-DC converter. The power consumed at the voltage-conversion circuit 40 can be reduced also in this way.

As for the voltage-conversion circuit 40 that is configured as a DC-DC converter in the present exemplary embodiment, its output voltage decreases when the value of the current that flows to the external device exceeds the upper limit; thus, an overheating of the voltage-conversion circuit 40 can be prevented or reduced by reducing electric power supplied to the external device from the voltage-conversion circuit 40 to the specified electric power or below.

In the present exemplary embodiment, different threshold values K1 and K3 are provided as the threshold values for determining whether to light the notification LED 28. When the external device is coupled to the USB connector 20, the threshold value K1 is used that is smaller than the threshold value K3, which is used when no external device is coupled to the USB connector 20.

Thus, the value of the battery voltage, at which the notification LED 28 is lit to encourage the user to charge the battery 12, can be set lower when the external device is coupled to the USB connector 20 than when no external device is coupled to the USB connector 20, so that electric power can be supplied to the external device until the battery 12 is empty. When no external device is coupled to the USB connector 20, charge of the battery 12 can be started earlier.

In the present exemplary embodiment, when the value of the battery voltage becomes lower than the lowest overdischarge threshold value (the threshold value K4), the battery 12 is protected from being overdischarged by ceasing to light the notification LED 28 and ending the control process.

Figure 6:
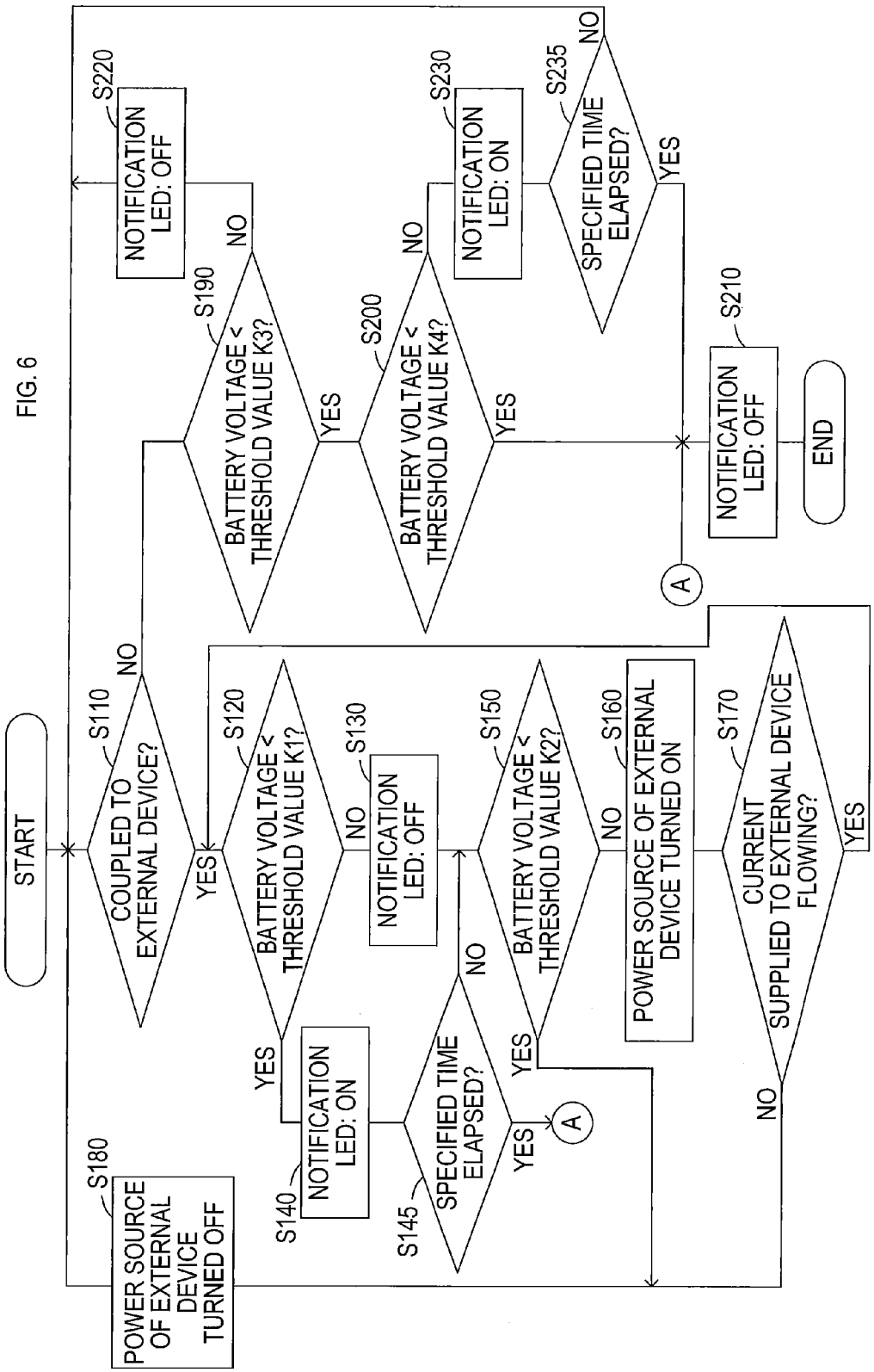
FIG. 6 is a flow chart showing a variation of a control process.

Alternatively, as shown in FIG. 6, it may be designed to cease lighting the notification LED 28 and to end the control process when a specified time has elapsed (S145 or S235) since the lighting of the notification LED 28 in S140 or in S230.

In the present exemplary embodiment, the voltage-conversion circuit 40 corresponds to an example of the power supply unit of the present disclosure; the external-device-detection circuit 46 corresponds to an example of the connection-detection unit of the present disclosure; the control circuit 50 corresponds to an example of the control unit of the present disclosure; the battery-voltage-measurement circuit 48 corresponds to an example of the voltage detection unit of the present disclosure; and, the light unit 6 corresponds to an example of the power-consumption unit of the present disclosure.

Embodiments of the present disclosure are as explained above; nevertheless, the present disclosure is not limited to the aforementioned exemplary embodiments and can be carried out in various modes without departing from the spirit of the present disclosure.

For example, it is assumed that the lighting device 2 of the aforementioned exemplary embodiment is used at a time of a disaster, such as an electric power outage or an earthquake, but stored in a designated storage place in normal times. If thus used, the lighting device 2 may not be found immediately when needed depending on how it is stored.

Thus, when no external device is coupled to the USB connector 20, the control circuit 50 may light the notification LED 28 or the light-emitting elements 10 of the light unit 6 in accordance with a preset timing (for example, on a regular basis).

In this case, an oscillation sensor 62 may be incorporated into the lighting device 2, as illustrated in dotted lines in FIG. 4, and the control circuit 50 may light the notification LED 28 or the light-emitting elements 10 of the light unit 6 in accordance with a preset timing (for example, on a regular basis) for a given length of time after the oscillation sensor 62 detects an oscillation. In a word, power consumption of the battery 12 can thus be reduced.

A luminance sensor 64 may be provided in the lighting device 2, as illustrated in dotted lines in FIG. 4, and the control circuit 50 may permit the notification LED 28 or the light-emitting elements 10 of the light unit 6 to be lit in accordance with a preset timing (for example, on a regular basis) on condition that a value of luminance of the surroundings detected by the luminance sensor 64 is equal to or below a specified value.

The aforementioned exemplary embodiments relate to a lighting device; nevertheless, the present disclosure can be applied in the same manner as in the aforementioned exemplary embodiments to any rechargeable electric devices that comprise a rechargeable battery, such as a rechargeable electric power tool, a rechargeable gardening tool, a rechargeable electric fan, and a rechargeable radio.

Figure 7:
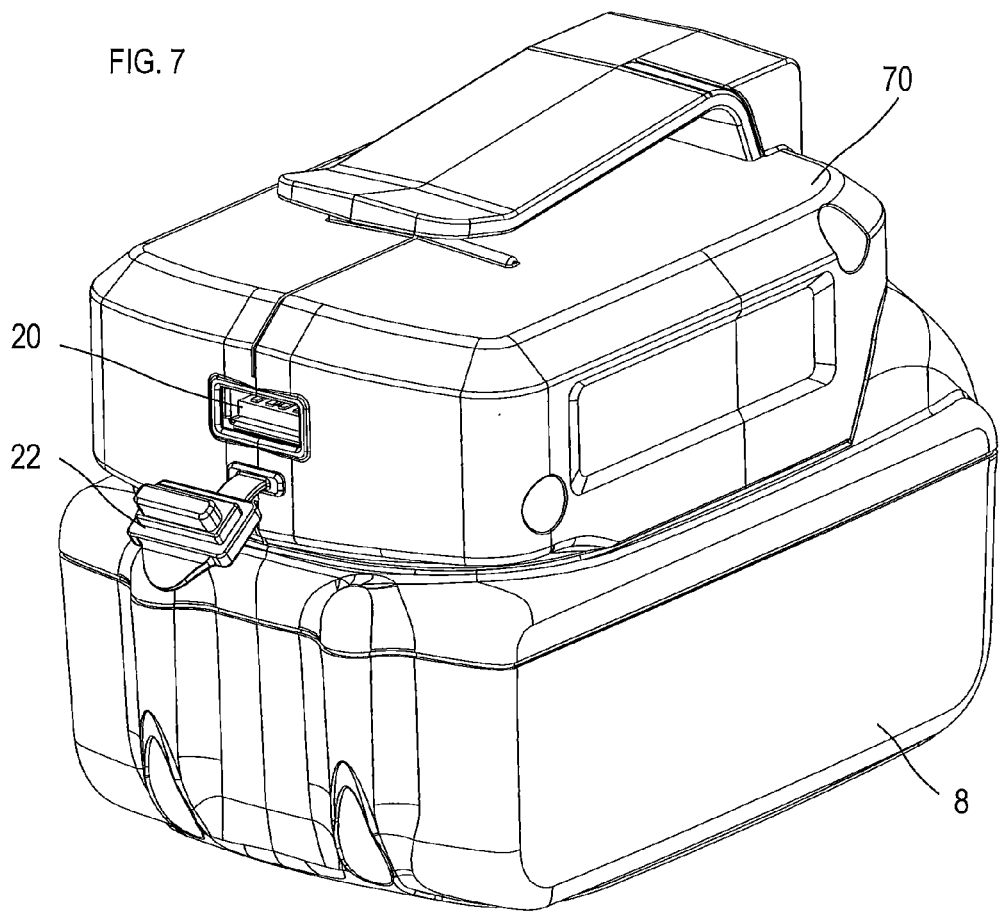
FIG. 7 is a perspective view of an external appearance of a battery pack, to which an adapter of another exemplary embodiment is attached.

A rechargeable electric device may be an adapter 70 that is attached to the battery pack 8 as shown in FIG. 7 to supply electric power to the external device, such as a portable device.

In other words, this adapter 70 comprises the USB connector 20 and the cap 22 in the same manner as in the aforementioned exemplary embodiments. If the circuit board 30, which comprises the components of the aforementioned exemplary embodiments except for the switching element 34 and the light unit 6, is incorporated into the adapter 70, and the control circuit 50 executes the same control process as in the aforementioned exemplary embodiments, the adapter 70 can be made as power-saving as the aforementioned exemplary embodiments are.

The aforementioned exemplary embodiments explain the electric device to which the battery pack comprising the battery can be detachably attached; nevertheless, the battery may be incorporated into the electric device and charged by coupling the electric device to an external battery charger.

In addition, the aforementioned exemplary embodiments explain that the power supply unit for supplying electric power to the external device is configured as the voltage-conversion circuit 40; nevertheless, the power supply unit may be any circuits that can supply electric power to the external device, for example, any circuits that are typically used as power supply circuits.

What is claimed is:

1. An electric device, comprising:
  a case;
  a connector that is configured to couple to an external device;
  a power supply unit that is configured to supply electric power to the external device via the connector;
  a connection-detection unit that is configured to detect whether the external device is coupled to the connector; and,
  a control unit that is configured to control electric power supplied to the power supply unit from a battery so as to increase electric power supplied to the power supply unit when the connection-detection unit detects that the external device is coupled to the connector, wherein the connector, the power supply unit, the connection-detection unit and the control unit are disposed in the case, and wherein the control unit is configured to light a light emitting unit in accordance with a preset timing when the connection-detection unit detects that the external device is not coupled to the connector.

2. The electric device of claim 1, wherein
the connector comprises a power supply terminal;
the connection-detection unit is configured to detect that the external device is coupled to the connector based on a voltage change in the power supply terminal; and,
the control unit is configured to increase electric power supplied to the power supply unit when the connection-detection unit detects that the external device is coupled to the connector.

3. The electric device of claim 1, wherein
the connector comprises a power supply terminal; and,
the power supply unit is configured to supply electric power to the external device so as to keep a voltage of the power supply terminal constant when a value of a current that flows to the connector is within a specified range.

4. The electric device of claim 3, wherein,
the power supply unit is configured to reduce a voltage of the power supply terminal and limit the value of the current that flows to the connector to a specified upper limit or below when the value of the current that flows to the connector reaches the upper limit.

5. The electric device of claim 1, wherein
the control unit is configured to either reduce or block electric power supplied to the power supply unit when a value of a current that flows to the connector is equal to or below a specified lower limit.

6. The electric device of claim 1, comprising an oscillation/impact detection unit that is configured to detect at least either an oscillation or an impact applied to the electric device,
wherein the control unit is configured to light the light emitting unit in accordance with a preset timing for a given length of time when either one of an oscillation or an impact is detected by the oscillation/impact detection unit.

7. The electric device of claim 1, comprising:
a luminance detection unit that is configured to detect a value of luminance surrounding the electric device,
wherein the control unit is configured to light the light emitting unit in accordance with a preset timing when the value of surrounding luminance detected by the luminance detection unit is equal to or below a specified value.

8. The electric device of claim 1, comprising:
a grip portion that is configured to provide a grip for a user; and,
the battery,
wherein the connector is disposed between the grip portion and the battery.

9. The electric device of claim 8, comprising a power-consumption unit that is configured to consume electric power of the battery and disposed on a side of the grip portion opposite to a side where the battery is provided.

10. The electric device of claim 1, wherein
the control unit is further configured to control electric power supplied to the power supply unit from a battery so as to increase electric power supplied to the power supply unit when the connection-detection unit detects that the external device is coupled to the connector and when the external device is receiving power from the battery via the power supply unit so as to keep the voltage of a power supply terminal of the connector constant when a value of a current that flows to the connector is within a specified range.

11. An electric device, comprising:
a connector that is configured to couple to an external device;
a power supply unit that is configured to supply electric power to the external device via the connector;
a connection-detection unit that is configured to detect whether the external device is coupled to the connector;
a voltage-detection unit that is configured to detect a value of a battery voltage of a battery and
a control unit that is configured to control electric power supplied to the power supply unit from the battery so as to increase electric power supplied to the power supply unit when the connection-detection unit detects that the external device is coupled to the connector,
wherein the control unit is further configured to perform a specified protective operation when the value of the battery voltage detected by the voltage-detection unit is equal to or below the overdischarge threshold value and to set the overdischarged threshold value in accordance with a result of detection by the connection-detection unit.

12. The electric device of claim 11, wherein
the control unit is configured to notify information related to the battery voltage via a notification unit when the value of the battery voltage detected by the voltage-detection unit is equal to or below the overdischarge threshold value.

13. The electric device of claim 12, wherein
the control unit is configured to set the overdischarge threshold value in accordance with a result of detection by the connection-detection unit such that the overdischarge threshold value while the external device is coupled to the connector is set smaller than the overdischarge threshold value while the external device is not coupled to the connector.

14. The electric device of claim 12, wherein,
the control unit is configured to continue notification via the notification unit until at least one of a first condition and a second condition is satisfied after the value of the battery voltage detected by the voltage-detection unit has become equal to or below the overdischarge threshold value, the first condition being a condition that the value of the battery voltage reaches a set value smaller than the overdischarge threshold value, and, the second condition being a condition that a specified time elapses.

15. An electric device, comprising:
a connector that is configured to couple to an external device;
a power supply unit that is configured to supply electric power to the external device via the connector;
a connection-detection unit that is configured to detect whether the external device is coupled to the connector;
an oscillation/impact detection unit that is configured to detect at least either an oscillation or an impact applied to the electric device; and
a control unit that is configured to control electric power supplied to the power supply unit from a battery so as to increase electric power supplied to the power supply unit when the connection-detection unit detects that the external device is coupled to the connector, wherein the control unit is further configured to light the light emitting unit in accordance with a preset timing for a given length of time when the connection-detection unit detects that the external device is not coupled to the connector and either one of an oscillation or an impact is detected by the oscillation/impact detection unit.

16. An electric device, comprising:
a connector that is configured to couple to an external device;
a power supply unit that is configured to supply electric power to the external device via the connector;
a connection-detection unit that is configured to detect whether the external device is coupled to the connector;
a luminance detection unit that is configured to detect a value of luminance surrounding the electric device; and
a control unit that is configured to control electric power supplied to the power supply unit from a battery so as to increase electric power supplied to the power supply unit when the connection-detection unit detects that the external device is coupled to the connector, wherein the control unit is further configured to light the light emitting unit in accordance with a preset timing when the connection-detection unit detects that the external device is not coupled to the connector and the value of surrounding luminance detected by the luminance detection unit is equal to or below a specified value.

* * * * *